United States Patent Office 3,706,029
Patented Dec. 12, 1972

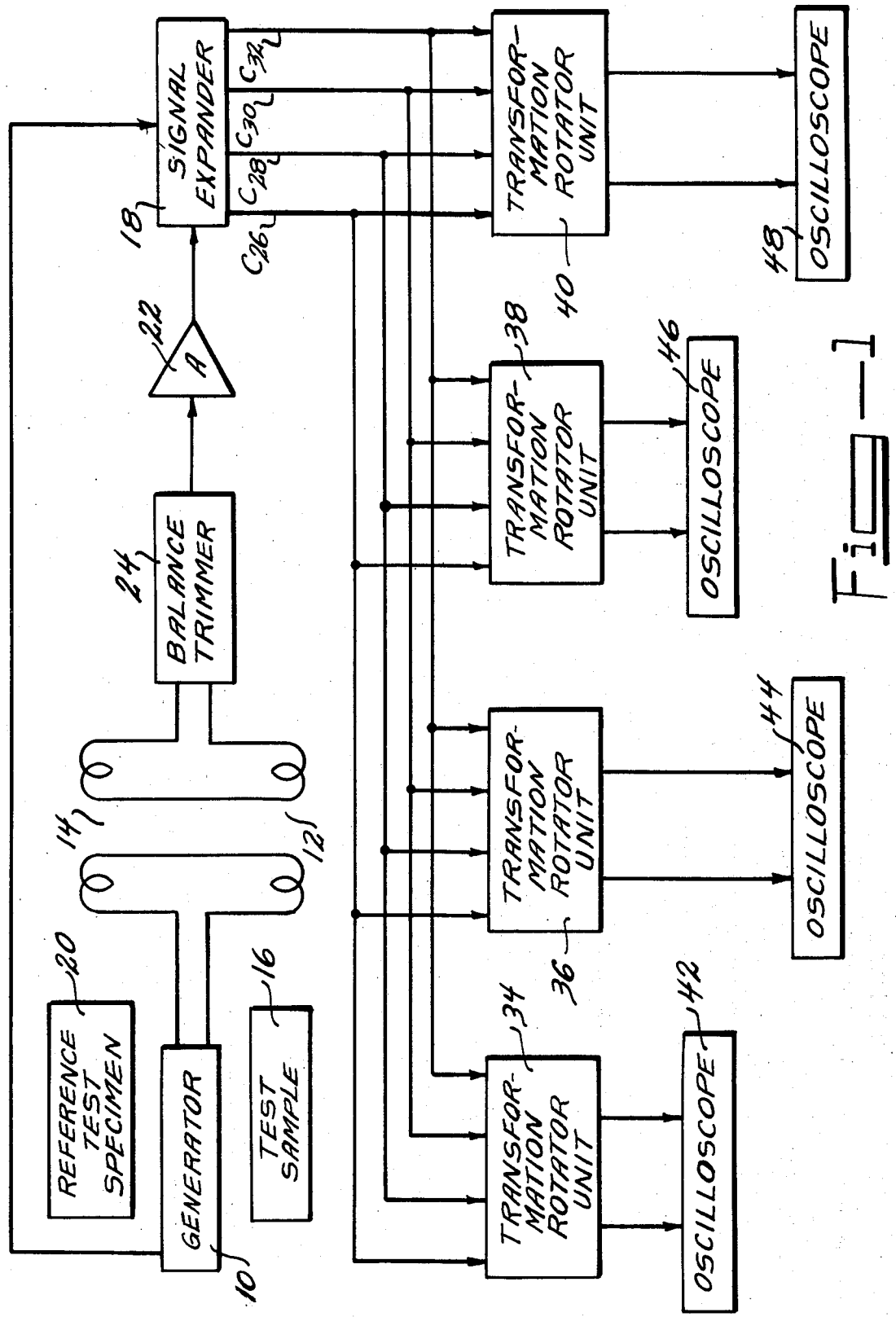
Fig—1

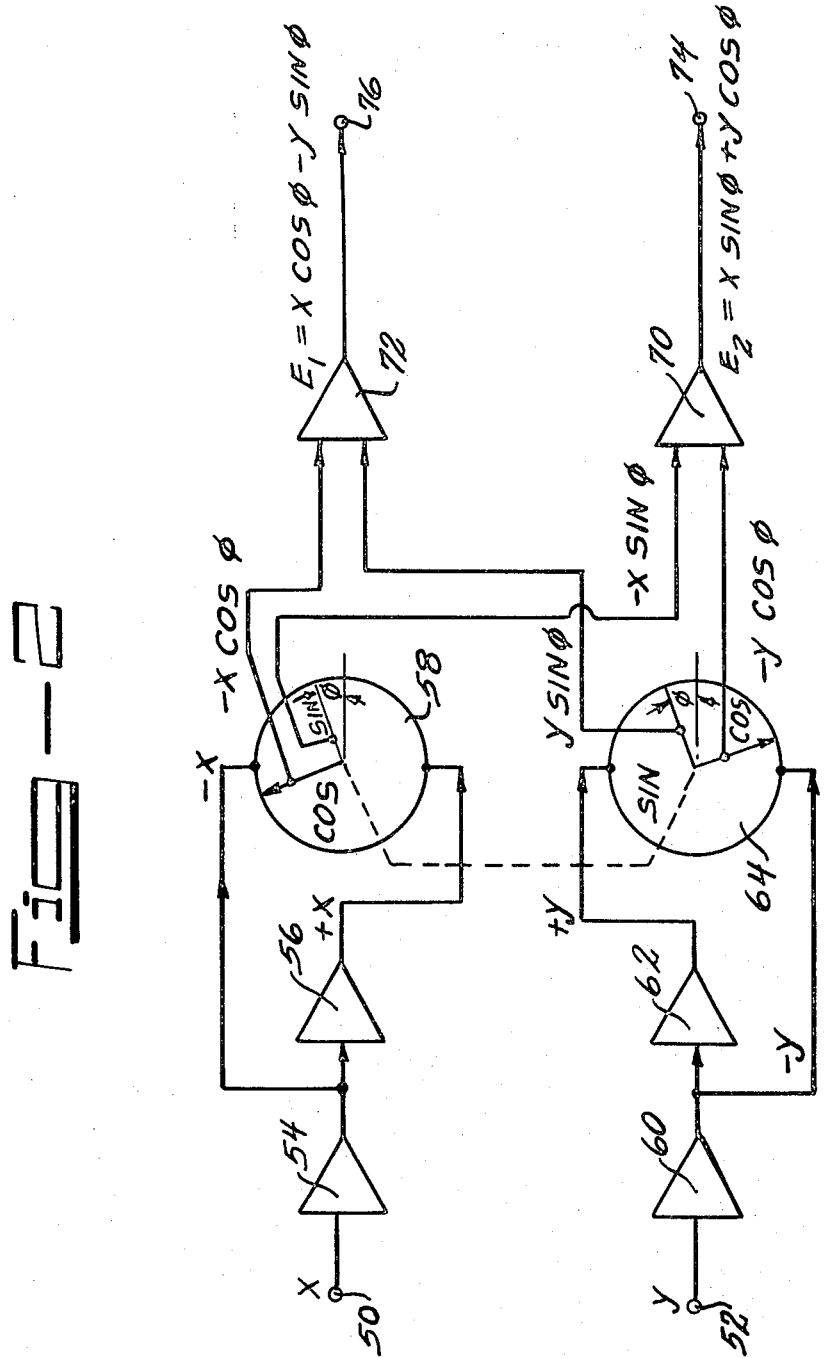

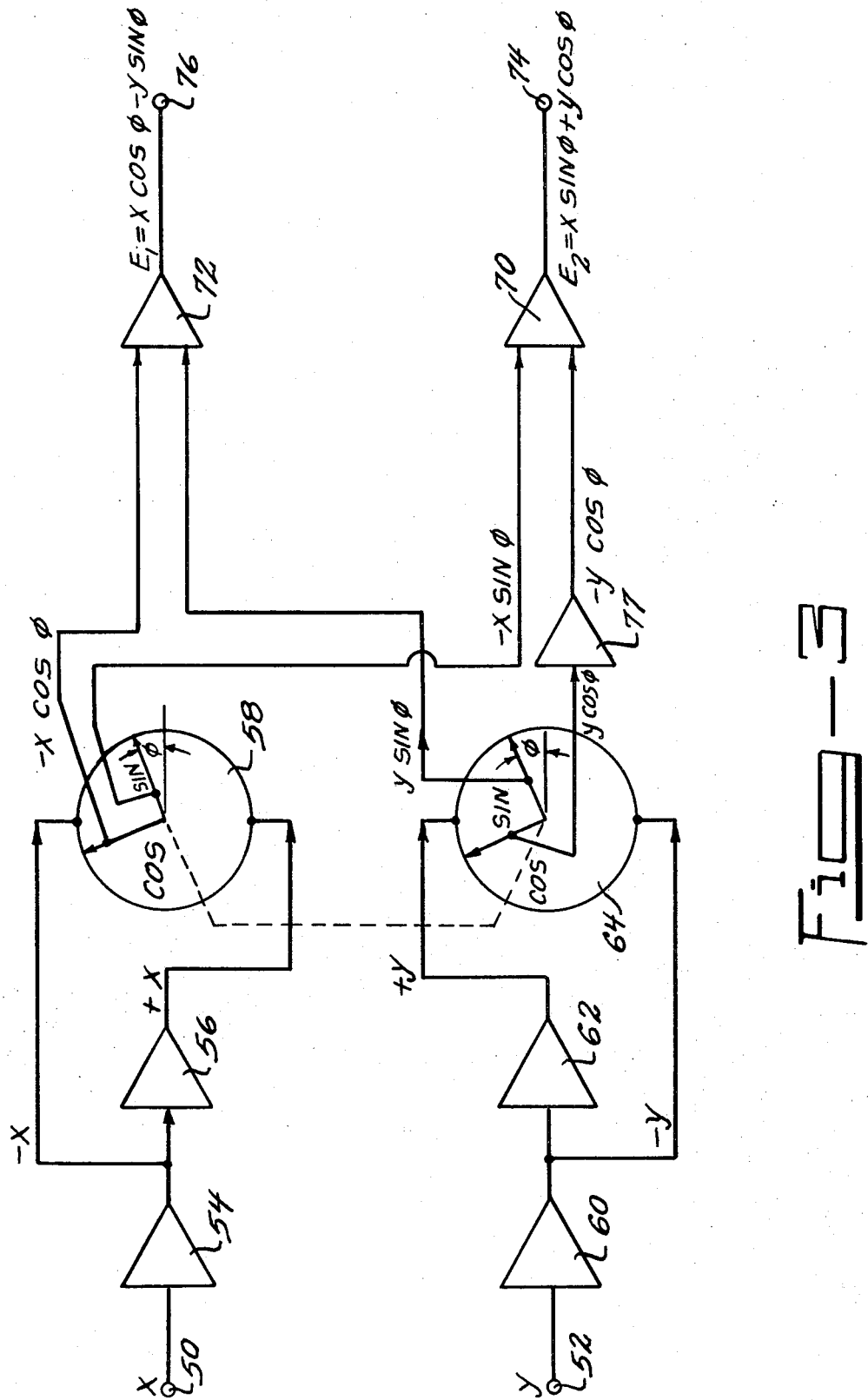

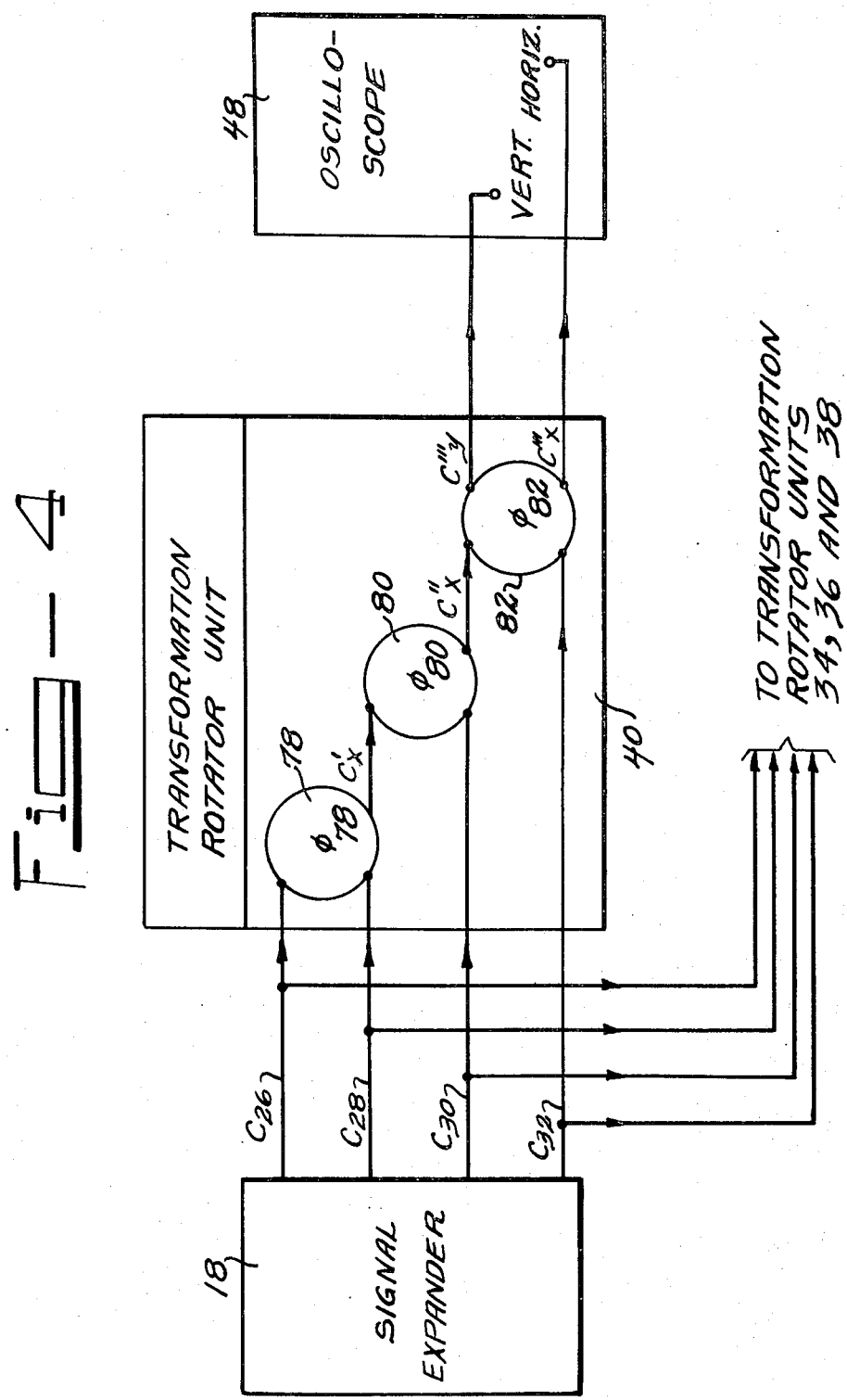

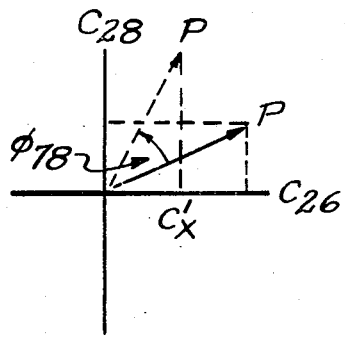
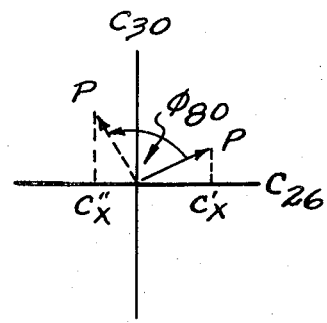
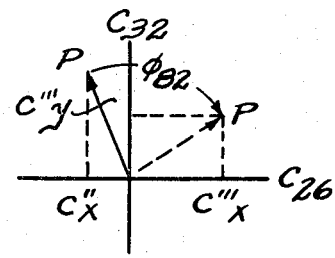
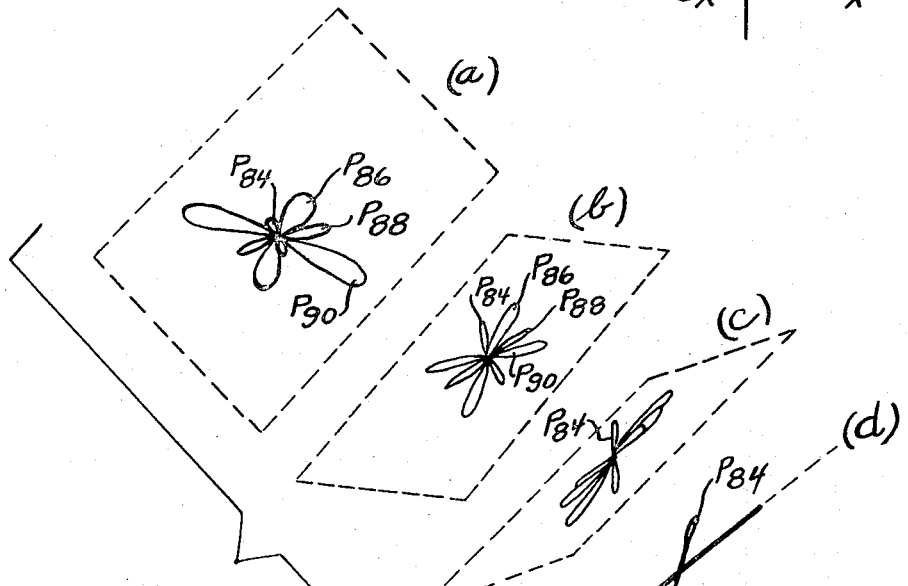

3,706,029
MULTIPLE PARAMETER EDDY CURRENT NONDESTRUCTIVE TESTING DEVICE USING PLURAL TRANSFORMATION ROTATORS TO RESOLVE EACH PARAMETER
Clarence R. Wandling, Kennewick, and Hugo L. Libby, Richland, Wash., assignors to the United States of America as represented by the United States Atomic Energy Commission
Filed Nov. 16, 1971, Ser. No. 199,212
Int. Cl. G01r 33/12
U.S. Cl. 324—40
9 Claims

ABSTRACT OF THE DISCLOSURE

An eddy current device for measuring multiple parameter variables of a sample comprises a test coil and signal generator means for applying a multidimensional excitation signal to the coil and magnetically coupling the coil to the sample. A signal expander expands the output signal from the test coil into N descriptors representative of the output signal. $N-1$ like transformation rotators are provided, each rotator including a pair of inputs and two ganged sine-cosine potentiometers rotationally displaced ninety degrees with respect to each other and connected via operational amplifiers and a summing amplifier to provide from the transformation rotator a first output $E_1 = x \cos \phi - y \sin \phi$ and a second output $$E_2 = x \sin \phi + y \cos \phi$$

where $x=$ an input signal applied to one of the rotator inputs, $y=$ an input signal applied to the other of the rotator inputs, and $\phi=$ the variable rotational angle of the ganged potentiometer. Each input of one of the transformation rotators is connected to an associated one of the signal descriptors, the remainder of the signal descriptors each being connected to an associated one input of the remainder of the transformation rotators. The other input of each of the remainder of the transformation rotators is connected to an output of a preceding associated transformation rotator. An oscilloscope displays the first and second outputs $E_1$ and $E_2$ of the last transformation rotator to provide a display of one parameter variable of the test sample.

CONTRACTUAL ORIGIN OF THE INVENTION

The invention described herein was made in the course of, or under, a contract with the United States Atomic Energy Commission.

BACKGROUND OF THE INVENTION

This invention relates to nondestructive eddy current testing devices and more particularly to multiple parameter nondestructive eddy current testing devices.

The conventional nondestructive eddy current testing device uses a single test frequency which gives two pieces of information about the test sample. These two pieces of information may be expressed either in polar or rectangular form from which it is possible to determine unambiguously the value of two test sample variables or parameters. Thus, if one desires to measure metal plate thickness or electrical conductivity, it is possible to do this using a single test frequency. However, if one desires to determine a third parameter variable, such as probe-to-sample spacing, a single test frequency does not produce sufficient information to determine the three variables unambiguously.

Further, even where additional variables are not of direct interest, their effects may mask those of the main variables thereby reducing the effectiveness of the test. Thus, using a single frequency gives a limited amount of information which in some cases is sufficient, but which generally leaves much of the test sample information unrevealed.

Hugo L. Libby in U.S. Pat. 3,229,198, dated Jan. 11, 1966, discloses an eddy current nondestructive testing device for measuring multiple parameter variables in a test sample. In this device, a multidimensional excitation current is applied to an eddy current coil to magnetically couple the coil to the test sample and the output signal from the coil is expanded into descriptors representing the output signal. These descriptors are summed using linear potentiometer summing circuits to provide individual variable parameter outputs. The linear potentiometer summing circuits require adjustment to give the desired discrimination against undesired parameters. These adjustments are done in one step. However, such a step is rather complex and difficult to effect. It is therefore desirable to provide a simpler adjustment circuit to effect transformation and discriminate against undesired parameters.

Accordingly, it is one object of the present invention to provide an improved eddy current nondestructive testing device for measuring multiple parameters of a test sample.

It is another object of the present invention to provide a nondestructive eddy current testing device for simultaneously measuring multiple parameters of a test sample which device embodies improved signal descriptor combining and display means.

It is another object of the present invention to provide improved means for combining and displaying descriptors representing an output signal from an eddy current probe coil magnetically coupled to a sample and excited by a multidimensional signal.

Other objects of the present invention will become more apparent as the detailed description proceeds.

In general, the eddy current device of the present invention comprises a test coil and means for applying a multidimensional excitation signal to the coil to magnetically couple the coil to a test sample. Means are provided for expanding the output signal of the probe coil into N descriptors representative of the output signal. $N-1$ like transformation rotators are provided, each including a pair of inputs and means for generating a first output $E_1 = x \cos \phi - y \sin \phi$ and a second output $$E_2 = x \sin \phi + y \cos \phi$$

where $x=$ an input signal applied to one of the rotator inputs, $y=$ an input signal applied to the other of the rotator inputs and $\phi=$ a variable reference angle. Means are also provided for connecting each input of one of the transformation rotators to an associated one of the signal descriptors and for connecting the remainder of the signal descriptors each to an associated one input of the remainder of the transformation rotators. Means connect the other input of the remainder of the transformation rotators to an output of a preceding associated transformation rotator and display the first and second outputs $E_1$ and $E_2$ of the last transformation rotator to provide a display of one parameter variable of the test sample.

Further understanding of the present invention may best be obtained from consideration of the accompanying drawings wherein:

FIG. 1 is a block diagram of an apparatus for accomplishing the present invention;

FIG. 2 is a detailed diagram of a transformation rotator used in the practice of the present invention;

FIG. 3 is a detailed diagram of an alternate transformation rotator used in the practice of the present invention;

FIG. 4 is a more detailed diagram of a transformation rotator unit connected in the apparatus of FIG. 1;

FIG. 5 is a vector display of signals rotated in a transformation rotator unit of FIG. 4;

FIG. 6 is a vector display of signals rotated in a transformation rotator unit of FIG. 4;

FIG. 7 is a vector display of signals rotated in a transformation rotator unit of FIG. 4; and FIG. 8 is a dimensional view showing the planar rotation and transformation using the apparatus of FIGS. 1, 2, 3 and 4.

In FIG. 1, a signal generator 10 supplies a multidimensional excitation current to test coils 12 and balance coils 14. The generator 10 also supplies a reference or timing signal to a signal expander 18. The ouput of the generator 10 may be in the form of single or repetitive pulses, combinations of rising or decaying exponential signals, or combinations of a number of sinusoidal signals. Thus, the excitation signal from generator 10 may be constructed to simplify the task of the signal expander 18.

For the purposes of the present invention, a multidimensional excitation signal is herein defined to be a signal represented by a superposition of more than two basis functions having prescribed amplitudes. Each basis function corresponds to a dimension of the excitation signal. The basis functions are the characteristic functions of a generalized Fourier series expansion of the excitation signal. For the purposes of this definition, the word multidimensional means more than two dimensions. In a two-frequency case, the four basis functions are the sine and cosine (or quadrature) components of the two frequencies forming the excitation signal. The amplitudes of the basis functions then represent the components of the four-dimensional current projected on four mutually orthogonal signal space axes.

As stated, the output of the signal generator 10 is fed to the test coils 12. The coils 12 are essentially similar in construction and operation to those of conventional eddy current nondestructive equipment, except that they must be operable over a desired broad frequency bandwidth without generating spurious responses. The balance coils 14 are identical to the test coils 12 and, using a reference test specimen 20, provide a null or near null signal input to an amplifier 22 for a desired condition of the test sample 16.

Due to unavoidable deficiencies in coil assembly construction and the existence of stray coupling, it is difficult to obtain a null condition with only the balance coils 14. Therefore, a trimmer unit 24 is used to provide a null adjustment. The output from amplifier 22 is transmitted to the signal expander 18 wherein the signal is expanded so that the outputs $C_{26}$, $C_{28}$, $C_{30}$ and $C_{32}$, called signal descriptors, represent the coefficients of the components of the signal from probe coil 12 on a selected basis. It will be appreciated that up to this point, the structure of FIG. 1 is identical to that disclosed by Hugo L. Libby in U.S. Pat. 3,229,198.

For the purposes of illustration, the present invention will operate on the four descriptor outputs $C_{26}$, $C_{28}$, $C_{30}$ and $C_{32}$ from signal expander 18 representing four parameter variables of test sample 16. It is to be understood that the present invention is not limited to four signal descriptor outputs, but is operable with additional parameter descriptors.

The descriptors $C_{26}$, $C_{28}$, $C_{30}$ and $C_{32}$ are each fed to an input of transformation rotator units 34, 36, 38 and 40. The transformation rotator units 34 through 40 are identical to each other and each operates to combine the descriptor inputs $C_{26}$ through $C_{32}$ to effect an output which is representative of only one parameter variable for the test sample 16. The output from transformation rotator units 34 through 40 are respectively displayed on a suitable device such as an oscilloscope 42, 44, 46 and 48 or an equivalent recorder.

As stated, the transformation rotator units 34–40 are identical. Accordingly, the following description will be limited to one transformation rotator unit 40. It is to be understood that the other rotator units 34, 36 and 38 are constructed in like manner.

The transformation rotator unit 40 includes transformation rotators of the type illustrated in FIG. 2. The rotator has two inputs 50 and 52. The input 50 is fed through operational amplifiers 54 and 56 to an input of a sine-cosine potentiometer 58. The input 50 is also fed through operational amplifier 54 to the other input of sine-cosine potentiometer 58. The input 52 is fed through operational amplifiers 60 and 62 to an input of a sine-cosine potentiometer 64. The input 52 is also fed through operational amplifier 60 to the other input of sine-cosine potentiometer 64. The sine-cosine potentiometers 58 and 64 are mounted on a common shaft in ganged rotational relationship with the potentiometers 58 and 64 being rotationally displaced ninety degrees with respect to each other. The sine-cosine function output signals from potentiometer 58 are fed respectively through an input of summing operational amplifiers 70 and 72. The sine-cosine output signals from potentiometer 64 are fed respectively to the other inputs of summing operational amplifiers 70 and 72. The summed signals from summing operational amplifiers 70 and 72 are fed respectively to outputs 74 and 76.

For the transformation rotator of FIG. 2 with an input signal $x$ applied to input 50 and an input signal $y$ applied to input 52, the operational amplifiers 54, 56, 60 and 62 operate to effect positive and negative polarity signal values of the respective input signals $x$ and $y$. Thus, the positive and negative polarities of the input signals ($x$, $-x$ and $y$, $-y$) are applied across the respective potentiometers 58 and 64 to provide driving voltages therefor. With the connections as shown in FIG. 2, sine-cosine potentiometer 58 provides signal outputs $-x \sin \phi$ and $-x \cos \phi$ and sine-cosine potentiometer 64 provides outputs $y \sin \phi$ and $-y \cos \phi$. The summing operational amplifier 72 combines the sine and cosine outputs of potentiometers 64 and 58 to provide an output, on output terminal 76, of $E_1 = x \cos \phi - y \sin \phi$, where $x$=the input signal on terminal 50, $y$= the input signal on terminal 52 and $\phi$=the rotational angle of the common shaft of potentiometers 58 and 64 from a reference angle. Similarly, summing operational amplifier 70 sums the sine output from potentiometer 58 and the cosine output from potentiometer 64 to provide an output signal, at terminal 74, of $$E_2 = x \sin \phi + y \cos \phi$$

where $x$=the input signal to terminal 50, $y$=the input signal to terminal 52 and $\phi$=the rotational angle of the common shaft of potentiometers 58 and 64 from a reference angle.

It is to be noted that the ninety degree rotational displacement between ganged potentiometers 58 and 64 may be eliminated by the addition of a polarity-changing amplifier in the cosine output of potentiometer 64. This is illustrated in FIG. 3 wherein is shown the addition of an operational amplifier 77 to the $\cos \phi$ output of potentiometer 64. In the embodiment of FIG. 3, the potentiometers 58 and 64 are in ganged rotational relationship with zero rotational displacement therebetween. With this relationship, the outputs from potentiometer 64 are $y \sin \phi$ and $y \cos \phi$. The operational amplifier 77 changes the output $y \cos \phi$ to $-y \cos \phi$ to provide the desired signal for combining into the $E_1$ and $E_2$ outputs.

For the practice of the present invention with four parameter variables as previously described, three transformation rotators as illustrated in FIG. 2 are used in each transformation rotator unit as illustrated in FIG. 4. In FIG. 4, the transformation rotator unit 40 comprises three transformation rotators 78, 80 and 82 of the type described above and illustrated in FIG. 2. The descriptors $C_{26}$ and $C_{28}$ from signal expander 18 are connected to the inputs of transformation rotator 78. The descriptor $C_{30}$ is connected to an input of transformation rotator 80 and the other input of rotator 80 is connected to the output of transformation rotator 78. The descriptor $C_{32}$ is connected to an input of transformation rotator 82 and the other input of transformation rotator 82 is connected to the output of rotator 80. The two outputs from transformation rotator 82 are connected to the oscilloscope 48 or a suitable recorder.

As stated, the four input signals $C_{26}$, $C_{28}$, $C_{30}$ and $C_{32}$ to the transformation unit 40 represent the vectorial components of signals caused by one or more specimen parameters. Since the descriptors $C_{26}$ and $C_{28}$ are the components of a parameter signal vector P projected on the $C_{26}$, $C_{28}$ plane as shown in FIG. 5, this vector projection can be rotated in the $C_{26}$, $C_{28}$ plane. This rotation is accomplished with transformation rotator 78 by rotating the common shaft of the ganged potentiometers through an angle $\phi_{78}$. Since this rotated vector has new rectangular coordinates, it will have new signal component values. One of these new component values can be represented by $C'_x$ and applied as one signal input to transformation rotator 80, the P vector signal component $C_{30}$ being applied as the other input. The signal vector is now projected on $C_{26}$, $C_{30}$ plane as shown in FIG. 6 and rotated in this plane by rotation of the common shaft of the ganged potentiometers through an angle $\phi_{80}$. The signal vector rotation with transformation rotator 80 creates two new signal components, one of which is labelled $C''_x$ and applied to one input of transformation rotator 82. The P signal vector $C_{32}$ is applied to the other input of transformation rotator 82. The P signal vector is now projected in the $C_{26}$, $C_{32}$ plane as shown in FIG. 7 and can be rotated in this plane with the transformation rotator 82 by rotation of the common shaft of the ganged potentiometers through an angle $\phi_{82}$. The P signal vector components $C'''_x$ and $C'''_y$, at the output terminals of transformation rotator 82, are then fed to the respective horizontal and vertical inputs of oscilloscope 48. If signals caused by other parameters ($P_1$, $P_2$, $P_3$ . . . $P_n$) were applied singularly to the transformation unit 40, they would be rotated in the same manner as described for P. Discrimination against certain unwanted parameter signals is accomplished by rotating the signals until the unwanted parameter signals appear projected on the $C_{26}$ axis and components of the parameter signal to be read out appear on the $C_{32}$ axis. The following mathematical operations describe the rotated signal vector components in the aforedescribed figures.

$$C'_x C_{26} \cos \phi_{78} - C_{28} \sin \phi_{78}$$

$$C''_x = (C_{26} \cos \phi_{78} - C_{28} \sin \phi_{78}) \cos \phi_{80} - C_{30} \sin \phi_{80}$$

$$C'''_x = [(C_{26} \cos \phi_{78} - C_{28} \sin \phi_{78}) \cos \phi_{80} - C_{30} \sin \phi_{80}] \cos \phi_{82} - C_{32} \sin \phi_{82}$$

$$C'''_y = [(C_{26} \cos \phi_{78} - C_{28} \sin \phi_{78}) \cos \phi_{80} - C_{30} \sin \phi_{80}] \sin \phi_{82} + C_{32} \cos \phi_{82}$$

Further understanding of the operation of the structure of the present invention may be obtained by considering the dimensional view of FIG. 8 wherein is shown, for the four parameter case, a two-dimensional projection of the signals in 4-space caused by the four parameters. The identified signals are $P_{84}$, $P_{86}$, $P_{88}$ and $P_{90}$. For purposes of illustration, the signal $P_{84}$ will be the sample parameter to be retained and displayed and the other three specimen parameters $P_{86}$, $P_{88}$ and $P_{90}$ will be discriminated against using the apparatus hereinbefore described in FIGS. 1, 2, 3 and 4. FIG. 8 shows the successive views ($a$, $b$, $c$, $d$ and $e$) of the separation of the parameter signals projected in two dimensions as viewed by an operator on the oscilloscope 48 to retain the signal $P_{84}$. Signals caused by all four parameters $P_{84}$, $P_{86}$, $P_{88}$ and $P_{90}$ appear as shown in view $a$. The transformation rotators 78 and 80 are then adjusted by rotation of the potentiometer shafts to successively give the plane projections shown in views $b$ and $c$ in which the signals caused by parameters $P_{86}$, $P_{88}$ and $P_{90}$ appear more collapsed. With further adjustments of transformation rotators 78 and 80, the undesired signals $P_{86}$ through $P_{90}$ are projected as an edge view in view $d$. It is to be noted that even though these signals $P_{84}$, $P_{86}$, $P_{88}$ and $P_{90}$ are Lissajou patterns of some complexity at the start, all of their final projections can be made to occur essentially in the one straight line. It is also to be noted that the signal caused by the variable parameter to be retained, $P_{84}$, has, in general, a component normal to the other three signals $P_{86}$, $P_{88}$ and $P_{90}$. The last rotation adjustment is made using transformation rotator unit 82 which rotates the pattern to that shown in view $e$ where the undesired signals $P_{86}$, $P_{88}$ and $P_{90}$ give deflections only in the horizontal direction. The retained desired signal, $P_{84}$, then has components in the vertical direction. These signals are read on output $C'''_y$ shown in FIG. 4, independent of the other signals which have been discriminated against.

Thus, the structure of the present invention has permitted the vector signals from three unwanted parameters to be projected in one straight line by adjusting (alternately or simultaneously in a converging series of adjustments) two of the transformation rotators. The effect of these three parameters is then finally minimized (nulled or eliminated) by the rotation of the shaft of the third transformation rotator 82. Thus, rotation of the two transformation rotators 78 and 80 places all of the undesired signals into a straight line in an x–y presentation and a second adjustment using the third transformation rotator 82 rotates this line into a horizontal position so that it has no vertical component. The signal of the fourth parameter does have a vertical component in this display and therefore may be read independently of the other three parameters.

As previously stated, the transformation rotator units 34, 36 and 38 are identical to that heretofore described for transformation rotator unit 40. These units are each adjusted in accordance with aforedescribed operations to simultaneously display different singular parameter variables for the test sample 16. For example, unit 34 can be adjusted to discriminate against parameters $P_{84}$, $P_{88}$ and $P_{90}$ and display parameter variable $P_{86}$; unit 36 can be adjusted to discriminate against $P_{84}$, $P_{86}$ and $P_{90}$ and display parameter variable $P_{88}$; and unit 38 can be adjusted to discriminate against parameters $P_{84}$, $P_{86}$ and $P_{88}$ and display parameter variable $P_{90}$.

The structure of the present invention permits decoupling adjustments and discrimination between parameters to be made in two simple stages rather than in the complex single stage required heretofore in the multiple parameter eddy current testing devices available.

It is to be further appreciated that the system heretofore set forth and described may be expanded to separate signals caused by additional parameters and that such is effected by simply adding more transformation rotator units and within each transformation rotator unit providing more transformation rotators whereby selective discrimination against the input variables may be effected.

Persons skilled in the art will, of course, readily adapt the teachings of the present invention to embodiments far different than the embodiments described and illustrated. Accordingly, the scope of protection afforded the present invention should not be limited to the embodiments described and illustrated above but should only be limited in accordance with the scope of the appended claims.

The embodiments of the invention in which an exclusive property or privilege is claimed are defined as follows:

1. An eddy current device for measuring multiple parameter variables of a sample comprising a test coil; means for applying a multidimensional excitation signal to said coil and magnetically coupling said coil to said sample; means for expanding the output signal of said probe coil into N descriptors representative of said output signal; $N-1$ like transformation rotators, each including a pair of inputs and means for generating a first output $E_1 = x \cos \phi - y \sin \phi$ and a second output $E_2 = x \sin \phi + y \cos \phi$, where $x =$ an input signal applied to one of said rotator inputs, $y =$ an input signal applied to the other of said rotator inputs and $\phi$=a variable reference angle; means for connecting each input of one of said transformation rotators to an associated one of said signal descriptors; means for connecting the remainder of said signal descriptors each to an associated one input of the remainder of said transformation rotators; means for connecting the other input of the remainder of said transformation rotators to an output of a preceding associated transformation rotator; and means for displaying the first and second outputs $E_1$ and $E_2$ of the last transformation rotator to provide a display of a parameter variable of said sample.

2. The apparatus according to claim 1 wherein said transformation rotator outputs $E_1$ and $E_2$ generating means comprise first and second sine-cosine potentiometers in ganged rotational relationship rotationally displaced ninety degrees apart; means connecting said first sine-cosine potentiometer and one of said rotator inputs to provide output signals from said first potentiometer of $-x \cos \phi$ and $-x \sin \phi$, where $x$=an input signal applied to said input and $\phi$=the rotational angle of the shaft of said ganged potentiometers from a reference position, means connecting said second sine-cosine potentiometer and the other of said rotator inputs to provide output signals from said second potentiometer of $y \sin \phi$ and $-y \cos \phi$ where $y$=an input signal applied to said other input and $\phi=$ the rotational angle of the shaft of said ganged potentiometers from a reference position, and means connected to said first and second potentiometers to combine the output signals therefrom to provide said first output $E_1 = x \cos \phi - y \sin \phi$ and said second output $E_2 = x \sin \phi + y \cos \phi$.

3. The apparatus according to claim 2 wherein said connecting means between said first and second potentiometers and said pair of inputs comprise first and second operational amplifiers interconnected between said first potentiometer and said one rotator input to provide driving input signals to said first potentiometer of $x$ and $-x$ where $x$=an applied input signal to said one rotator input; and third and fourth operational amplifiers interconnected between said second potentiometer and said other detector input to provide driving input signals to said second potentiometer of $y$ and $-y$ where $y$=an applied input signal to said other detector input.

4. The apparatus according to claim 3 wherein said first and second potentiometer output signal combining means comprise a fifth summing operational amplifier connected to sum the $-x \cos \phi$ output signal of said first potentiometer and the $y \sin \phi$ output signal of said second potentiometer to provide said first output $E_1 = x \cos \phi - y \sin \phi$; a sixth summing operational amplifier connected to sum the $-x \sin \phi$ output signal of said first potentiometer and the $-y \cos \phi$ output signal of said second potentiometer to provide said second output $E_2 = x \sin \phi + y \cos \phi$.

5. The apparatus according to claim 1 wherein said transformation rotator outputs $E_1$ and $E_2$ generating means comprise first and second sine-cosine potentiometers in ganged aligned rotational relationship; means connecting said first sine-cosine potentiometer and one of said rotator inputs to provide output signals from said first potentiometer of $-x \cos \phi$ and $-x \sin \phi$ where $x$=an input signal applied to said input and $\phi$=the rotational angle of the shaft of said ganged potentiometers from a reference position, means connecting said second sine-cosine potentiometer and the other of said rotator inputs to provide output signals from said second potentiometer of $y \sin \phi$ and $y \cos \phi$ where $y$=an input signal applied to said other input and $\phi=$ the rotational angle of the shaft of said ganged potentiometers from a reference position, and means connected to said first and second potentiometers to combine the output signals therefrom to provide said first output $E_1 = x \cos \phi - y \sin \phi$ and said second output $E_2 = x \sin \phi + y \cos \phi$.

6. The apparatus according to claim 5 wherein said connecting means between said first and second potentiometers and said pair of inputs comprise first and second operational amplifiers interconnected between said first potentiometer and said one rotator input to provide driving input signals to said first potentiometer of $x$ and $-x$ where $x$=an applied input signal to said one rotator input; and third and fourth operational amplifiers interconnected between said second potentiometer and said other detector input to provide driving input signals to said second potentiometer of $y$ and $-y$ where $y$=an applied input signal to said other detector input.

7. The apparatus according to claim 6 wherein said first and second potentiometer output signal combining means comprise a fifth summing operational amplifier connected to sum the $-x \cos \phi$ output signal of said first potentiometer and the $y \sin \phi$ output signal of said second potentiometer to provide said first output $E_1 = x \cos \phi - y \sin \phi$; a sixth operational amplifier connected to said $y \cos \phi$ output of said second potentiometer to provide an output from said sixth operational amplifier of $-y \cos \phi$; a seventh summing operational amplifier connected to sum the $-x \sin \phi$ output signal of said first potentiometer and the $-y \cos \phi$ output signal of said sixth operational amplifier to provide said second output $E_2 = x \sin \phi + y \cos \phi$.

8. An eddy current device for measuring multiple parameter variables of a sample comprising a test coil; means for applying a multidimensional excitation signal to said coil and magnetically coupling said coil to said sample; means for expanding the output signal of said probe coil into N descriptors representative of said output signal; $N-2$ like transformation rotators, each including two inputs and means for generating an output $E = x \cos \phi - y \sin \phi$ where $x$=an input signal applied to one of said inputs, $y$=an input signal applied to the other of said inputs and $\phi$=a variable reference angle; a final transformation rotator including two inputs and means for generating a first output $E_1 = x \cos \phi - y \sin \phi$ and a second output $E_2 = x \sin \phi + y \cos \phi$ where $x$=an input signal applied to one of said inputs, $y$=an input signal applied to the other of said inputs and $\phi$ is a variable reference angle; means for connecting each input of one of said $N-2$ transformation rotators to an associated one of said descriptors; means for connecting one input of each of the remainder of said $N-2$ transformation rotators and said final transformation rotator to an associated one of the remainder of said descriptors; means for connecting the other input of each of the said remainder of said $N-2$ transformation rotators and said final transformation rotator to the output of an associated $N-2$ transformation rotator; and means for displaying said first and second $E_1$ and $E_2$ outputs of said final transformation rotator to provide a display of a parameter variable of said test sample.

9. The apparatus according to claim 8 wherein said E output generating means of said $N-2$ like transformation rotators generates an output $E = x \sin \phi + y \cos \phi$ where $x$=an input signal applied to one of said rotator inputs, $y$=an input signal applied to the other of said rotator inputs and $\phi$=a variable reference angle.

References Cited
UNITED STATES PATENTS

| | | | |
|---|---|---|---|
| 3,229,198 | 1/1966 | Libby | 324—40 |
| 3,391,336 | 2/1968 | Hentschel | 324—37 |

ROBERT J. CORCORAN, Primary Examiner